(12) United States Patent
Yahagi

(10) Patent No.: US 6,522,479 B2
(45) Date of Patent: Feb. 18, 2003

(54) ZOOM LENS

(75) Inventor: Satoshi Yahagi, Fuchu (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 24 days.

(21) Appl. No.: 09/800,663

(22) Filed: Mar. 8, 2001

(65) Prior Publication Data

US 2001/0033429 A1 Oct. 25, 2001

(30) Foreign Application Priority Data

Mar. 15, 2000 (JP) ........................................ 2000-071956

(51) Int. Cl.[7] .............................................. G02B 15/14
(52) U.S. Cl. ........................ 359/698; 359/696; 359/697
(58) Field of Search ................................ 359/684, 688, 359/696, 697, 698; 396/80

(56) References Cited

U.S. PATENT DOCUMENTS

| 4,842,378 A | * | 6/1989 | Murakami et al. | ........... 359/698 |
| 4,924,317 A | * | 5/1990 | Hirao et al. | ................. 348/351 |
| 5,432,332 A | * | 7/1995 | Kaneko | .................... 250/201.7 |
| 5,758,206 A | * | 5/1998 | Imaoka | ......................... 396/80 |
| 5,802,405 A | * | 9/1998 | Sugimoto | ..................... 396/82 |
| 2001/0033429 A1 | * | 10/2001 | Yahagi | ......................... 359/684 |

FOREIGN PATENT DOCUMENTS

| JP | 3-56915 | 3/1991 |
| JP | 4-153615 | 5/1992 |
| JP | 2569093 | 10/1996 |
| JP | H11-2757 | 1/1999 |

* cited by examiner

Primary Examiner—Georgia Epps
Assistant Examiner—David N. Spector
(74) Attorney, Agent, or Firm—Arnold International; Bruce Y. Arnold

(57) ABSTRACT

A zoom lens having both manual mode and auto focus mode of focus adjustment. The zoom lens includes, in order from the object side, a focus portion, a zoom portion, and a main portion. Zooming is accomplished by moving some or all of the lens elements in the zoom portion along the optical axis. What would otherwise be a fluctuation of the image surface with change of object distance is corrected in manual mode by manually moving some or all of the lens elements of the focus portion along the optical axis based on visual observation of the object through the zoom lens as the adjustment is made. In auto focus mode, what would otherwise be a fluctuation of the image surface with change of object distance is corrected by micro-vibrating some or all of the lens elements of a lens group in the light path following the focus portion. A signal that varies according to image quality variations caused by this micro-vibration is detected and the detected signal is used to automatically control the position of those lens elements in the focus portion that are manually moved in order to adjust focus in manual mode. At least one surface a lens element that is micro-vibrated in auto focus mode is aspherical, and at least one surface of a lens element that is micro-vibrated in auto focus mode includes a diffractive optical element having diffraction zones formed thereon.

6 Claims, 6 Drawing Sheets

ZOOM LENS

BACKGROUND OF THE INVENTION

In zoom lenses for home video cameras which have recently been widely popularized, simplification of the zoom lens construction is desired because of market demands for smaller size, less weight, and lower pricing. A zoom lens suitable for a home video camera has been disclosed in Japanese Laid Open Application H4-153615 wherein, in order from the object side, the first lens group has positive refractive power and is fixed in position, the second lens group has negative refractive power and is moved in the direction of the optical axis to change the focal length during zooming, the third lens group has positive refractive power and is fixed in position, and the fourth lens group has positive refractive power and is moved along the optical axis to change the focal length during zooming and to correct what would otherwise be a fluctuation of image surface position with movement of the second lens group or a change of object distance. In zoom lenses of this type, movement of the fourth lens group for both zooming and focusing is an important factor that enables such zoom lenses to have a simplified construction. Moreover, in this type of zoom lens, the lens groups also are smaller and lighter in weight due to miniaturization of the zoom lens. Further, the movement of the moveable lens groups during zooming or focusing is easy. Thus, this type of construction has been both convenient and popular.

By contrast, in video cameras used for broadcasting or other business uses, higher imaging performance has been demanded than is provided by zoom lenses used for home video cameras. Thus, the picture quality provided by broadcasting cameras is higher than that of video cameras for home use, especially in the case of recording color images. However, it is difficult to provide images having sufficient quality using simplified-construction zoom lenses as found in home video cameras.

As an example of a high-performance zoom lens suitable for broadcast quality imaging, a zoom lens has been disclosed in Japanese Laid Open Patent Application H3-56915. This zoom lens is formed of five lens groups having refractive powers of, in order from the object side, positive, negative, negative, positive, and positive, respectively. The focal length of the zoom lens is changed by moving the second and third lens groups along the optical axis when zooming, and focusing is performed by moving, for example, all or some of the lens elements of the first lens group. Thus, the lens elements moved for focus adjustment are moved independently of the lens elements that are moved for varying the focal length during zooming.

Manual focus and auto focus are known focusing techniques for zoom lenses. Auto focus (for example, as described in Japanese Patent 2569093 and in Japanese Laid Open Patent Application H11-2757) has been used thus far primarily in zoom lenses for home video cameras, as these video cameras emphasize ease of operation. These zoom lenses are constructed so that the direction and amount of movement of the lens elements for focusing are automatically determined based on images received by an image pickup array that is used to perform auto focus. Namely, in a zoom lens for home video cameras, it is common for a portion of the optical system in the zoom lens to be micro-vibrated in the direction of the optical axis, while the micro-vibrated portion is automatically moved in the direction of the optical axis for focus adjustment in order to match the best image surface position with the position of an image pickup array. The best match is based on a signal extracted from an image signal detected by an image pickup array of the zoom lens. Thus, a zoom lens of simple constitution is achieved by moving the micro-vibrated optical system in order to accomplish the focusing.

The zoom lens described in Japanese Patent No. 2569093 comprises a fixed front lens group, a variator lens group which varies the, focal length, a compensator lens group for correcting for what would otherwise be aberrations caused by varying the focal length, and a main lens group. Some or all of the lens elements of the main lens group are made so as to be both shakable and movable by using the step driving of a pulse motor, and these lenses are moved by the step driving of the pulse motor based on a signal extracted from an image signal obtained from an image pickup array while micro-vibrating these lenses in the direction of the optical axis.

The zoom lens described in Japanese Laid Open Patent Application H11-2757 comprises a fixed front lens group, a variator lens group, a diaphragm, a fixed lens group, a micro-vibrating portion and an imaging portion. The micro-vibrating portion functions both as a focusing portion and a correcting portion. If a controlling means micro-vibrates the micro-vibrating portion in the direction of the optical axis via a driving means, a focus evaluating means evaluates the focusing condition of formed photo images for each frame, an operating means determines the direction and amount of movement of the micro-vibrating portion based on these evaluated values, and then the driving means drives the micro-vibrating portion in the direction of the optical axis to match the focus based on these values.

By contrast, it is sometimes desired to express subtle nuances while recording various scenes using high-performance video cameras, e.g., those of broadcast quality. Therefore, a manually focused zoom lens having a high degree of freedom and that is capable of performing focus or zoom manually based on visual information of finder images has been desired by professional cameramen.

Recently, market demand has arisen for auto focus in video cameras of broadcasting and business quality. For example, in news gathering the quickness of reports is emphasized to such an extent that there is a need to shorten the time required by a professional cameraman to focus a scene. Or, if the depth of subjects is too shallow to be focused like a high-performance camera, it takes time for a subtle adjustment even by a skilled cameraman. Moreover, sometimes automatic focusing by a high-precision camera is needed beyond a level of focus adjustment that can be obtained using one's eyes.

There is a problem in applying the auto focus mechanism of zoom lenses of home video cameras to zoom lenses of high-performance broadcast or business-use cameras. Namely, the lens elements of zoom lenses for home video cameras have tended to become small-sized and light-weight due to the miniaturization of the zoom lens with the simplification of design. Accordingly, the lens groups that are moved for focusing are light-weight, and the micro-vibration of these lenses in the direction of the optical axis to obtain information concerning the optimum focus position has not been a problem. However, the lens elements that move for focusing of zoom lenses used for broadcasting and business tend to be large and heavy. The micro-vibration of these lens elements is not realistic. Therefore, market demand for a zoom lens which has a different construction from that of state-of-the-art home video cameras and is well-suited for use in a high-performance video camera of broadcast or business quality, and which has auto focus, has intensified.

Although zoom lenses with auto focus operation are the norm for home video cameras where ease of operation is paramount, for broadcast or business quality video cameras manual operation mode is the norm and the use of auto focus is supplemental. Situations requiring the use of auto focus are not all that frequent for a professional cameraman. Nevertheless, a high quality zoom lens which can operate in auto focus mode is needed for those situations when a cameraman feels that manual operation mode of the zoom lens is not satisfactory.

BRIEF SUMMARY OF THE INVENTION

A first object of the invention is to provide a high-performance zoom lens suitable for business video cameras in which focus may be selectively adjusted manually when in manual mode, or automatically when in auto focus mode. A second object of the invention is to provide a zoom lens capable of auto focus even where the lens elements that are moved during manual focus adjustment are large and heavy.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

This invention relates to a zoom lens having both a manual focus mode and an auto focus mode. More particularly, the invention is a zoom lens suitable for use in T.V. broadcasting or business video cameras. Zoom lenses for video cameras can be classified into ones intended for the home video camera market and ones intended for business use, such as T.V. broadcasting or air business video recording. The construction of zoom lenses for these two markets is different due to different features being of primary concern and due to a difference in pricing.

The zoom lens of the present invention is formed of, in order from the object side, a focusing portion, a zooming portion and a main portion. The focal length of the zoom lens is changed by moving some or all of the lens elements of the zooming portion along the optical axis. What would otherwise be a fluctuation of image surface position with change of object distance is corrected while in manual mode by manually moving some or all of the lens elements of the focus portion along the optical axis based on visual observation through the zoom lens. In auto focus mode, what would otherwise be a fluctuation of the image surface with change of object distance is corrected by micro-vibrating some or all of the lens elements of a lens group positioned in the light path following the focus portion while detecting a signal that detects image quality variations caused by this micro-vibration and using the detected signal to automatically control the position of those lens elements in the focus portion that are manually moved in manual mode.

Moreover, it is preferable that the focus portion is composed of the first lens group, in order from the object side, and that this lens group has positive refractive power. Further, it is preferred that the zoom portion is composed of the second and third lens groups, in order from the object side, and that the third lens group has negative refractive power. Additionally, it is preferred that the main portion is composed of the fourth and fifth lens groups, in order from the object side, and that the fifth lens group has positive refractive power. The focal length of the zoom lens is changed during zooming by moving the second lens group and the third lens group along the optical axis. Preferably the lens elements that are micro-vibrated along the optical axis during auto focus are in the fourth lens group, in order from the object side. Furthermore, it is preferable that at least one surface of among the lens element surfaces that are micro-vibrated during auto focus is aspherical and that at least one surface of among the lens element surfaces that are micro-vibrated during auto focus includes a diffractive optical element having diffraction zones formed thereon.

Figure 1:
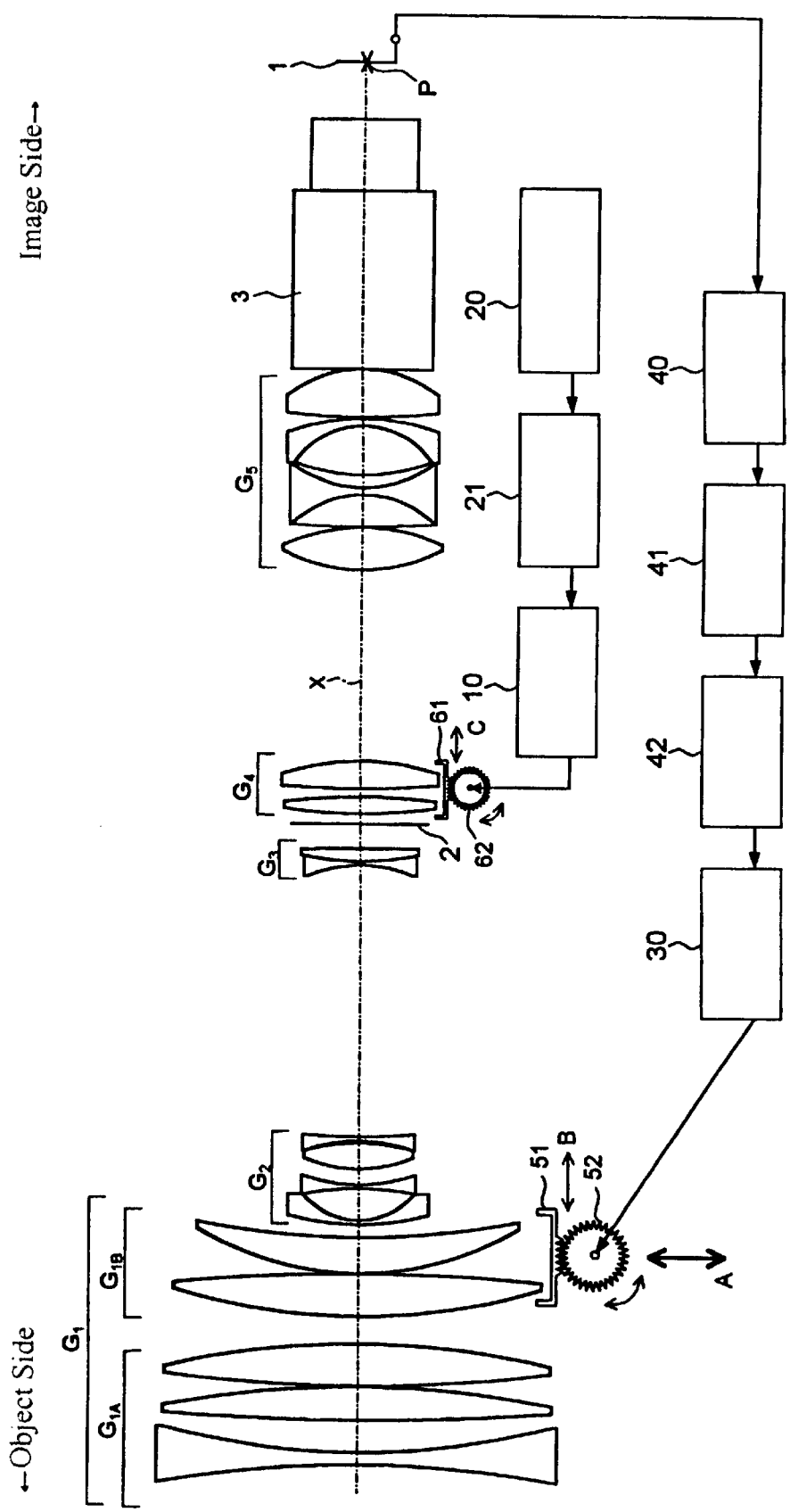
FIG. 1 shows the basic lens element configuration of the zoom lens of Embodiment 1.

A general description of the zoom lens of the invention will now be given. As shown in FIG. 1, a focus portion formed of the first lens group $G_1$ with positive refractive power, a zoom portion formed of the second lens group $G_2$ with negative refractive power and the third lens group $G_3$ with negative refractive power, and a main portion formed of the fourth lens group $G_4$ with positive refractive power and the fifth lens group $G_5$ with positive refractive power are arranged in this order from the object side, and light that is incident from the object side along the optical axis X is imaged at the image position P of the solid-state image pickup array 1. Moreover, a diaphragm 2 is arranged between the third lens group $G_3$ and the fourth lens group $G_4$, and an optical system 3 including a low-pass filter, etc. is arranged on the image side of the fifth lens group $G_5$.

Furthermore, the focal length of the zoom lens is changed by moving the second lens group $G_2$ and the third lens group $G_3$ along the optical axis so that the space between the second lens group $G_2$ and the third lens group $G_3$ is varied in order to correct for what otherwise would be fluctuations of the image surface as the focal distance is changed during zooming.

The focus portion, namely—the first lens group $G_1$, is composed of a fixed, first subgroup $G_{1A}$ located nearest the object side and a movable, second subgroup $G_{1B}$ that may be moved along the optical axis so as to correct for what otherwise would be fluctuations of image surface position with changes of object distance and to suppress fluctuations of optical imaging performance with changes of object distance. Moreover, during either manual focus or auto focus, the second subgroup $G_{1B}$ is moved along the optical axis.

More specifically, when in manual focus mode, the lens subgroup $G_{1B}$ can be manually moved along the optical axis based on visual observation of the object through the zoom lens. When in auto focus mode, some or all of the lens elements of the second lens group $G_2$ or lens elements thereafter in the light path are micro-vibrated in the direction along the optical axis while detecting a signal responsive to image quality variations caused by this micro-vibration. The detected signal is used to automatically control the position of lens subgroup $G_{1B}$ along the optical axis. This is specifically illustrated in FIG. 1. First, a lens holder driving mechanism 52 (conceptually shown as a gear) that is arranged near the lens holder 51 of lens subgroup $G_{1B}$ is set in a state of being released from engagement with lens subgroup $G_{1B}$ by moving it in the downward direction of double-headed arrow A. In this manner the lens holder 51 is made to be movable along the optical axis (as indicated by double-headed arrow B) according to the turning operation of a focus ring by the user. On the other hand, when the lens holder driving mechanism 52 is set to an engaged state by moving it in the upward direction of double headed arrow A, the lens holder 51 is made to be movable along the optical axis according to a driving action of this lens holder driving mechanism 52. Moreover, the zoom lens is so constituted that the manual/auto moving operation of the lens holder driving mechanism 52 is performed by interlocking it with the switch operation of a manual/auto selector switch 20, as described later.

Furthermore, the lens elements that are micro-vibrated in a direction along the optical axis during auto focus are those in the fourth lens group $G_4$, and the lens elements that are moved for adjusting the focus during auto focus comprise the same lens group $G_{1B}$ that is moved during manual focus. If the user switches from manual focus to auto focus using the manual/auto selector switch 20, an auto switching signal is output from this switch 20, and a micro-vibration controlling means 21 gives an instruction to a micro-vibration driving means 10 according to the signal so as to micro-vibrate the fourth lens group $G_4$ along the optical axis as a unit.

A lens holder micro-vibrating mechanism 62 (shown conceptually as a gear) lies between the micro-vibration driving means 10 and the lens holder 61 for holding the fourth lens group $G_4$, and the lens holder 61 is micro-vibrated in the direction of double-headed arrow C according to the micro-vibrating action of the lens holder micro-vibrating mechanism 62.

The image quality of photo images formed on the solid-state image pickup array 1 varies with the micro-vibration, and the focusing condition of these images for each frame is evaluated in a focus evaluating means 40. In the operating means 41, the direction and amount of movement of the lens subgroup $G_{1B}$ to obtain optimum focus are calculated in a known manner. Focus movement controlling means 42 controls the focus movement driving means 30 based on the calculated value of the operating means 41, and the lens subgroup $G_{1B}$ is automatically driven as a unit along the optical axis to achieve proper focus.

By this means, both manual focus control and auto focus control can be selectively provided in a zoom lens suitable for business applications, such as broadcasting or the recording of quality video images. The micro-vibrated lens elements may be some or all of the lens elements in the light path following the focus portion. Here, the efficiency for micro-vibration is high because the lens elements that are micro-vibrated are smaller and lighter than would be the case if the more massive lens elements of the focus portion were vibrated. The micro-vibrated lens elements do not influence zoom adjustment of the zoom lens, and there is room in front and back of the lens elements that are micro-vibrated.

However, the lens elements that are moved to alter the focus adjustment are lens elements of the focus portion. These lens elements tend to be large-diameter lens elements, since they are nearer the object side in a high-performance zoom lens than the lens elements that are micro-vibrated. The micro-vibration of such large-diameter lens elements would be very inefficient during auto focus. However, these larger lens elements are more easily moved during manual focus, since they match the size of the hand, and may readily be moved during auto focus by focus movement driving means 30 to automatically adjust the focus. Thus, the lens elements that are micro-vibrated when in auto focus mode are small and light, and the lens elements that are moved to actually adjust the focus are lens elements of the focus portion, and are the same large, easily gripped, lens elements that are moved during manual focus mode in order to adjust the focus. Thus, such a design enables the zoom lens to be capable of auto focus mode, where quickness of focusing is paramount, as well as to be capable of being manually focused by adjusting large, easily gripped lens elements as is done in a high-quality camera suitable for business use.

Although, the lens holder driving mechanism 52 and the lens holder micro-vibrating mechanism 62 are each conceptually shown by a gear in FIG. 1, these mechanisms 52, 62 are actually more complicated mechanisms. For example, they can be constituted of well-known rack mechanisms, cam mechanisms, ball and screw mechanisms, piezoelectric elements, and so on.

Several embodiments of the invention will now be set forth in detail.

Embodiment 1

Figure 2:
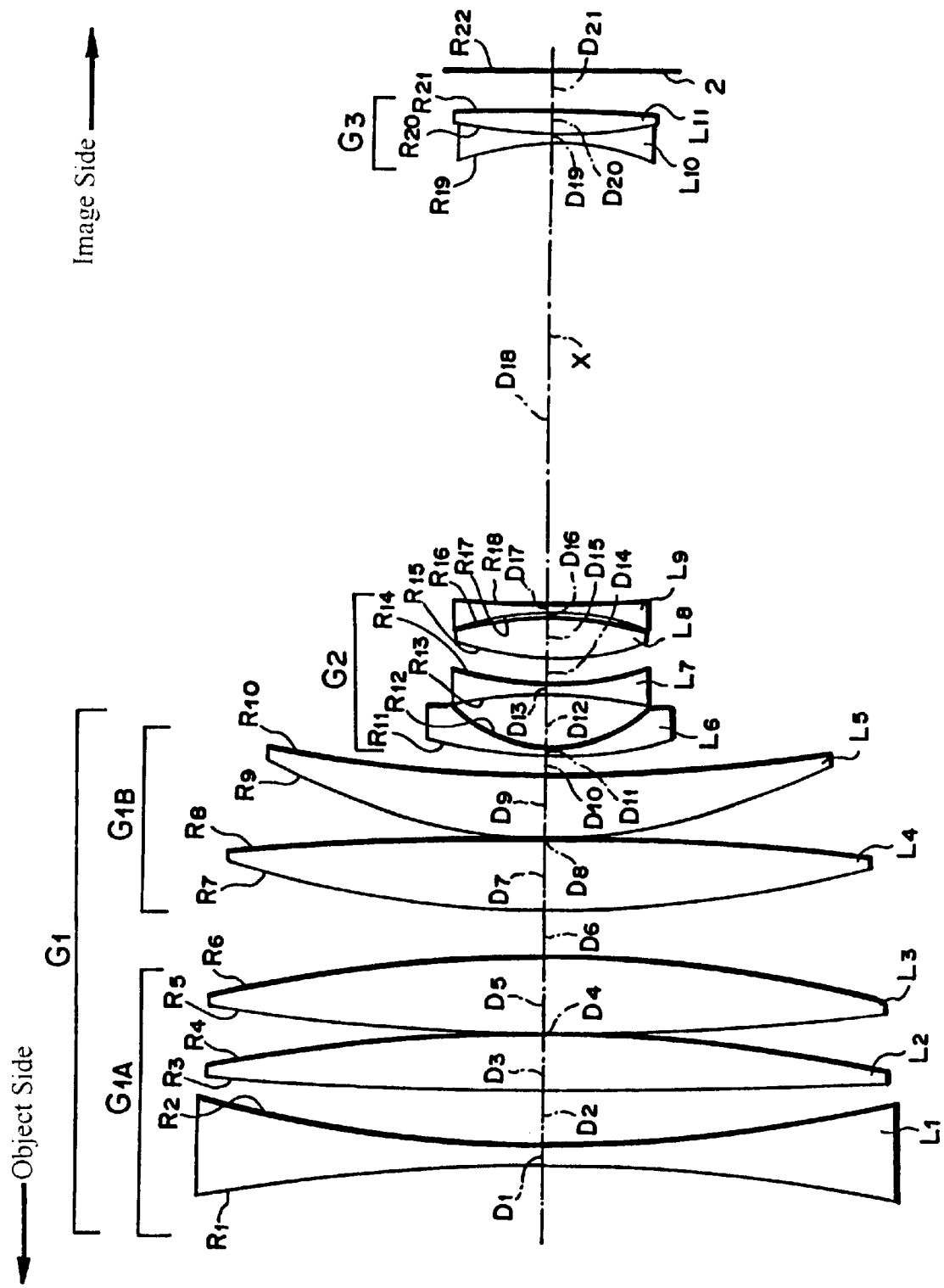
FIG. 2 shows, in detail, the basic lens element configuration of a portion of the zoom lens of Embodiment 1, namely, the lens elements in the first, second and third lens groups.
Figure 3:
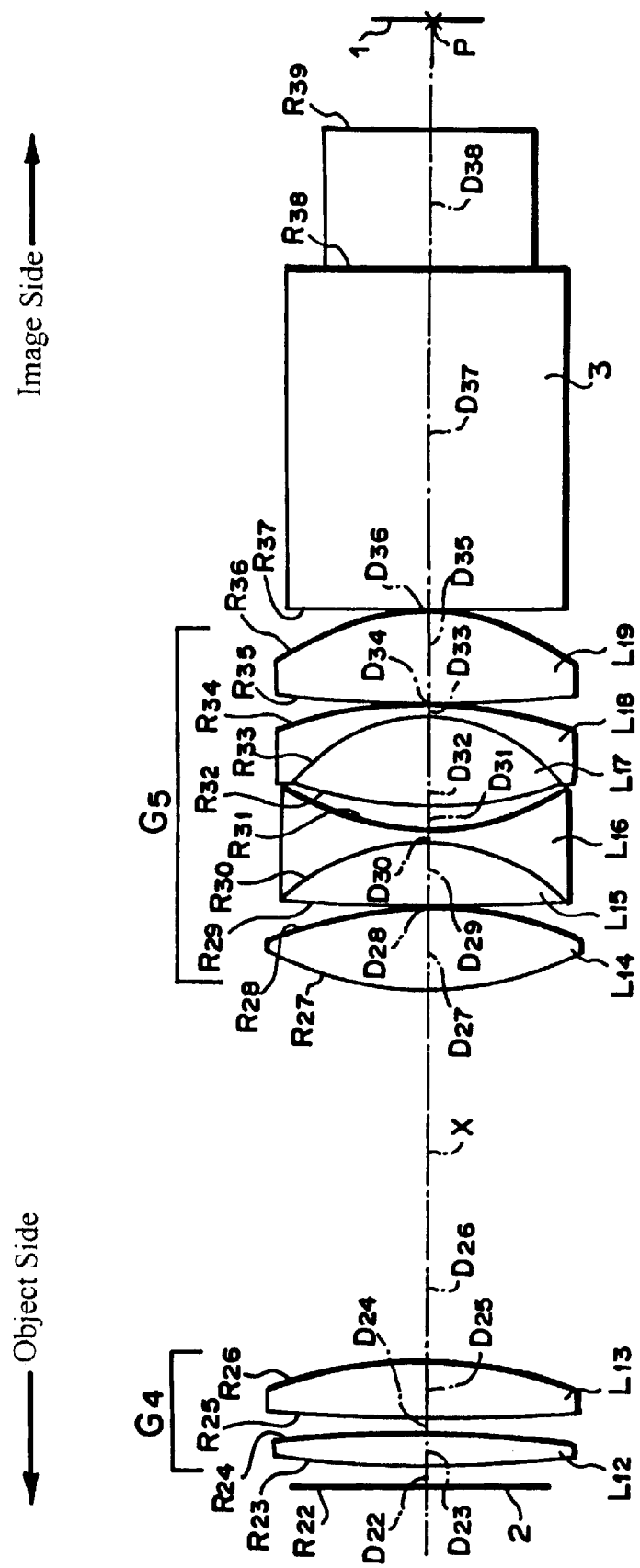
FIG. 3 shows, in detail, the lens element configuration of the remaining portion of the zoom lens of Embodiment 1, namely, the lens elements in the fourth and fifth lens groups.

FIG. 1 shows the basic lens element configuration of the zoom lens of Embodiment 1, and FIG. 2 shows, in detail, the basic lens element configuration of a portion of the zoom lens of Embodiment 1, namely, the lens elements in the first, second and third lens groups, and FIG. 3 shows, in detail, the lens element configuration of the remaining portion of the zoom lens of Embodiment 1, namely, the lens elements in the fourth through fifth lens groups.

Referring to FIG. 2, lens subgroup $G_{1A}$ is formed of, in order from the object side, a biconcave lens element $L_1$, and two biconvex lens elements $L_2$ and $L_3$. Lens subgroup $G_{1B}$ is formed of, in order from the object side, a biconvex lens element $L_4$ and a positive meniscus lens element $L_5$. Lens group $G_2$ is formed of, in order from the object side, a negative meniscus lens element $L_6$, a biconcave lens element $L_7$, a biconvex lens element $L_8$ and a biconcave lens element $L_9$. Lens group $G_3$ is formed of, in order from the object side, a biconcave lens element $L_{10}$ that is joined to a biconvex lens element $L_{11}$.

Referring to FIG. 3, lens group $G_4$ is formed of, in order from the object side, two biconvex lens elements $L_{12}$ and $L_{13}$, and lens group $G_5$ is formed of, in order from the object side, a biconvex lens element $L_{14}$, a biconvex lens element $L_{15}$ that is joined to a biconcave lens element $L_{16}$, a biconvex lens element $L_{17}$ that is joined to a negative meniscus lens element $L_{18}$ and a biconvex lens element $L_{19}$.

In this embodiment, the lens elements that are microvibrated along the optical axis comprise those in the fourth lens group $G_4$, namely $L_{12}$ and $L_{13}$, and the lens elements that are moved for focusing are those in lens subgroup $G_{1B}$, namely $L_4$ and $L_5$.

Table 1 below lists the surface number #, in order from the object side, the radius of curvature R (in mm) of each surface, the on-axis spacing D (in mm) between surfaces, as well as the refractive index $N_d$ and the Abbe number $\upsilon_d$ (at the d line) of each lens element of Embodiment 1. The ranges of focal length f and $F_{NO}$ of the zoom lens of this embodiment (from the wide-angle end to the telephoto end) are shown in the lower portion of Table 1.

TABLE 1

| # | R | D | $N_d$ | $\upsilon_d$ |
|---|---|---|---|---|
| 1 | −208.320 | 2.25 | 1.80517 | 25.4 |
| 2 | 143.900 | 6.01 | | |
| 3 | 521.990 | 6.17 | 1.43387 | 95.1 |
| 4 | −191.410 | 0.12 | | |
| 5 | 273.760 | 7.84 | 1.43387 | 95.1 |
| 6 | −161.350 | D6 (variable) | | |
| 7 | 121.980 | 7.84 | 1.60300 | 65.4 |
| 8 | −373.910 | 0.12 | | |
| 9 | 60.177 | 6.56 | 1.74100 | 52.6 |
| 10 | 163.000 | D10 (variable) | | |
| 11 | 49.253 | 0.80 | 1.83480 | 42.7 |
| 12 | 14.164 | 5.79 | | |
| 13 | −55.261 | 0.75 | 1.81600 | 46.6 |
| 14 | 32.398 | 2.93 | | |
| 15 | 27.337 | 4.77 | 1.80517 | 25.4 |
| 16 | −35.336 | 0.44 | | |
| 17 | −27.753 | 0.75 | 1.81600 | 46.6 |
| 18 | 123.950 | D18 (variable) | | |
| 19 | −25.646 | 0.81 | 1.75500 | 52.3 |
| 20 | 53.347 | 2.40 | 1.84665 | 23.9 |
| 21 | −317.420 | D21 (variable) | | |
| 22 | ∞ (stop) | 1.94 | | |
| 23 | 99.567 | 3.08 | 1.58267 | 46.4 |
| 24 | −127.630 | 1.42 | | |
| 25* | 134.275 | 5.12 | 1.58913 | 61.2 |
| 26 | −47.869 | 0.62 | | |
| 27 | 32.678 | 7.73 | 1.48749 | 70.4 |
| 28 | −37.690 | 0.12 | | |
| 29 | 185.067 | 6.01 | 1.51453 | 54.7 |
| 30 | −19.606 | 1.30 | 1.83400 | 37.1 |
| 31 | 23.217 | 2.27 | | |
| 32 | 36.531 | 8.97 | 1.51824 | 58.9 |
| 33 | −16.017 | 1.25 | 1.80400 | 46.6 |
| 34 | −43.918 | 0.36 | | |
| 35 | 147.130 | 8.76 | 1.48749 | 70.4 |
| 36 | −23.220 | 0.0 | | |
| 37 | ∞ | 33.00 | 1.58266 | 46.4 |
| 38 | ∞ | 13.20 | 1.51633 | 64.0 |
| 39 | ∞ | | | |
| | f = 8.3–120.2 | $F_{NO}$ = 1.77–2.19 | | |

The lens surface listed with a * to the right of the surface number above (i.e., surface #25) is aspherical and also includes a diffractive optical element having diffraction zone micro structure formed on the surface. The shape of the aspherical surface without the diffractive optical element micro structure formed therein is given by Equation (A) below.

$$Z = CY^2/\{1+(1-KC^2Y^2)^{1/2}\} + A_4Y^4 + A_6Y^6 + A_8Y^8 + A_{10}Y^{10} \quad \text{Equation (A)}$$

where

Z is the length (in mm) of a line drawn from a point on the aspherical surface at distance Y from the optical axis to the tangential plane of the aspherical surface vertex, C(=1/R) is the curvature of the aspherical surface near the optical axis, Y is the distance (in mm) from the optical axis, K is the eccentricity, and $A_4$, $A_6$, $A_8$, and $A_{10}$ are the 4th, 6th, 8th, and 10th aspherical coefficients.

The values of D6, D10, D18 and D21 in the column of axial spacing D in Table 1 above are listed in Table 2.

TABLE 2

| | Wide-Angle End | Telephoto End |
|---|---|---|
| D6 | 6.65 | 6.65 |
| D10 | 0.80 | 49.02 |
| D18 | 50.33 | 4.05 |
| D21 | 4.37 | 2.43 |

The values of each of the constants K and $A_4$–$A_{10}$ of the aspherical surface #25 indicated in Table 1 above are listed in Table 3.

TABLE 3

| # | K | $A_4$ | $A_6$ | $A_8$ | $A_{10}$ |
|---|---|---|---|---|---|
| 25 | 0.9888078 | $-5.6456201 \times 10^{-6}$ | $3.5778963 \times 10^{-9}$ | $9.1892984 \times 10^{-12}$ | $-5.7611945 \times 10^{-14}$ |

In addition to being an aspherical surface as defined above, surface #25 includes a diffractive optical element having diffraction zone micro structures formed thereon according to the phase difference function $\Phi(Y)$ given in Equation (B), below.

$$\Phi(Y) = EY^2 + FY^4 + GY^6 + HY^8 + IY^{10} \quad \text{Equation (B)}$$

The coefficients E, F, G, H, and I of Equation (B) for the diffractive optical element structure on surface #25 are listed in Table 4.

TABLE 4

| E | F | G | H | I |
|---|---|---|---|---|
| $-1.9216058 \times 10^{-5}$ | $-2.9681680 \times 10^{-8}$ | $-4.6200137 \times 10^{-11}$ | $-7.3316614 \times 10^{-14}$ | $-1.1702427 \times 10^{-16}$ |

In this embodiment, a light-weight, low cost zoom lens is achieved using an aspherical surface and a diffractive optical element having diffraction zone micro structure formed on a surface in at least a portion of the optical system that is micro-vibrated during auto focus mode, thereby requiring fewer lens elements for a given quality of imaging as compared with the number of lens elements that would be required if only spherical lens elements were used. Further, the fact that the number of lens elements is reduced ensures that there is space to move the lens elements that are moved during focusing. More particularly, optical performance equal to a combined lens formed of high and low dispersion optical material is achieved using a single lens element of low mass but with a diffractive optical element having diffraction zone micro structure formed on a surface of the single lens element. In this manner aberrations can be alleviated using a single lens by use of the diffractive optical element.

Figure 5A:
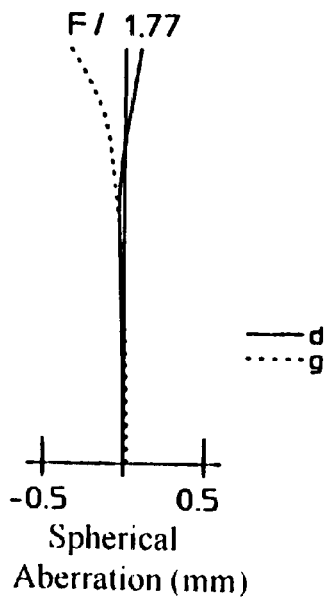
FIGS. 5A–5C, and 5D–5F show various aberrations of the zoom lens of Embodiment 1 at the wide-angle end and the telephoto end, respectively; and, FIGS. 6A–6C, and 6D–6F show various aberrations of the zoom lens of Embodiment 2 at the wide-angle end and the telephoto end, respectively.
Figure 5B:
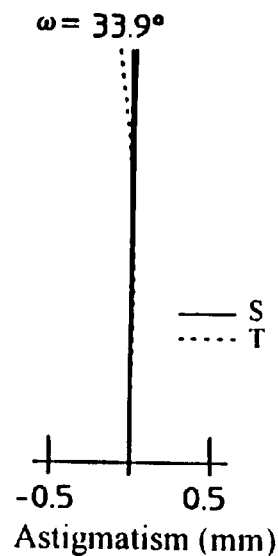
Figure 5C:
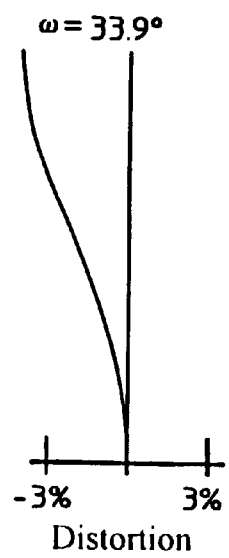
Figure 5D:
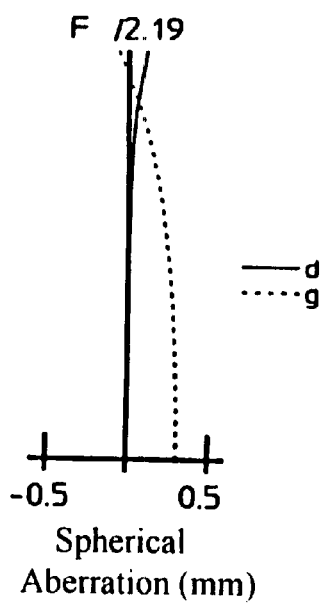
Figure 5E:
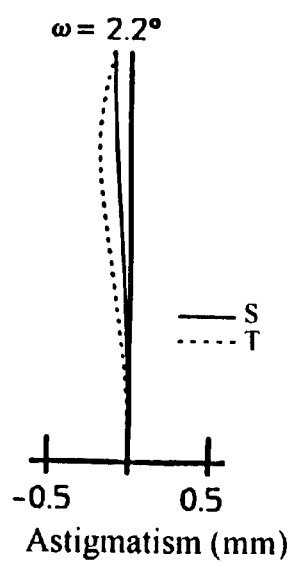
Figure 5F:
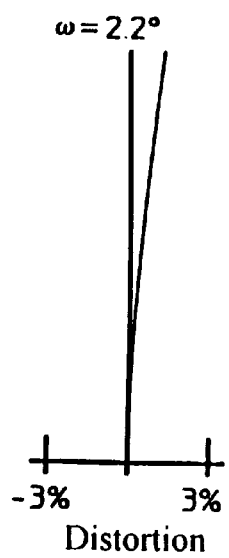

FIGS. 5A–5C show the spherical aberration, astigmatism, and distortion, respectively, for the zoom lens of Embodiment 1 at the wide-angle end. FIGS. 5D–5F show the spherical aberration, astigmatism, and distortion, respectively, for the zoom lens of Embodiment 1 at the telephoto end. In each spherical aberration figure, curves for both the d and g lines are illustrated. In each astigmatism figure, curves for both the sagittal S and tangential T image planes are illustrated. As is apparent from these figures, the aberrations are favorably corrected over the entire range of zoom so that high-quality images are obtained.

Embodiment 2

Figure 4:
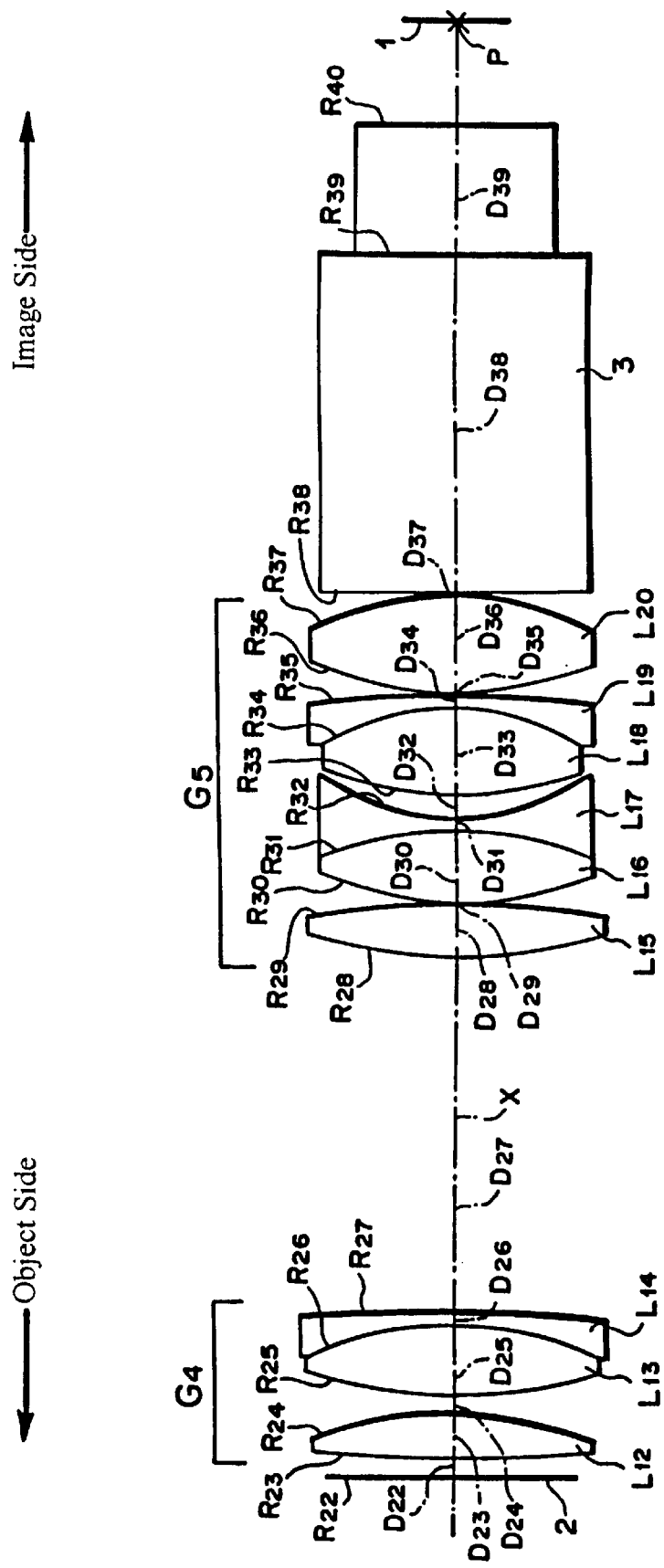
FIG. 4 shows, in detail, the lens element configuration of a portion, namely—the lens elements in the fourth lens group and the fifth lens group, of the zoom lens of Embodiment 2.

Embodiment 2 has the same construction, for the first through the third lens groups, as Embodiment 1. However this embodiment differs in construction in the fourth and fifth lens groups. FIG. 4 is the block diagram showing the basic lens element configuration of the fourth lens group and the fifth lens group of the zoom lens of Embodiment 2. In this embodiment, the main portion also is formed of the fourth lens group $G_4$ having positive refractive power and a fifth lens group $G_5$ having positive refractive power. Just as in Embodiment 1, the fourth lens group $G_6$ is micro-vibrated along the optical axis during auto focus mode and lens subgroup $G_{1B}$ is moved for changing the focus of the zoom lens.

Moreover, although they are omitted in FIG. 4, the lens of this embodiment also is provided with a micro-vibration driving means 10, a manual/auto selector switch 20, a micro-vibration controlling means 21, a lens holder 61 and a lens holder micro-vibrating mechanism 62 as well as a focus evaluating means 40, an operating means 41, a focus movement controlling means 42, a focus movement driving means 30, a lens holder 51 and a lens holder driving mechanism 52.

Table 5 below lists the surface number #, in order from the object side, the radius of curvature R (in mm) of each surface, the on-axis spacing D (in mm) between surfaces, as well as the refractive index $N_d$ and the Abbe number $\upsilon_d$ (at the d line) of each lens element of Embodiment 2. The ranges of focal length f and $F_{NO}$ of the zoom lens of this embodiment (from the wide-angle end to the telephoto end) are shown in the lower portion of Table 5.

TABLE 5

| # | R | D | $N_d$ | $\upsilon_d$ |
|---|---|---|---|---|
| 1 | −208.320 | 2.25 | 1.80517 | 25.4 |
| 2 | 143.900 | 6.01 | | |
| 3 | 521.990 | 6.17 | 1.43387 | 95.1 |
| 4 | −191.410 | 0.12 | | |
| 5 | 273.760 | 7.84 | 1.43387 | 95.1 |
| 6 | −161.350 | D6 (variable) | | |
| 7 | 121.980 | 7.84 | 1.60300 | 65.4 |
| 8 | −373.910 | 0.12 | | |
| 9 | 60.177 | 6.56 | 1.74100 | 52.6 |
| 10 | 163.000 | D10 (variable) | | |
| 11 | 49.253 | 0.80 | 1.83480 | 42.7 |
| 12 | 14.164 | 5.79 | | |
| 13 | −55.261 | 0.75 | 1.81600 | 46.6 |
| 14 | 32.398 | 2.93 | | |
| 15 | 27.337 | 4.77 | 1.80517 | 25.4 |
| 16 | −35.336 | 0.44 | | |
| 17 | −27.753 | 0.75 | 1.81600 | 46.6 |
| 18 | 123.950 | D18 (variable) | | |
| 19 | −25.646 | 0.81 | 1.75500 | 52.3 |
| 20 | 53.347 | 2.40 | 1.84665 | 23.9 |
| 21 | −317.420 | D21 (variable) | | |
| 22 | ∞ (stop) | 1.94 | | |
| 23* | 157.066 | 4.77 | 1.57500 | 41.5 |
| 24 | −36.632 | 1.42 | | |
| 25 | 47.478 | 7.00 | 1.48749 | 70.4 |

TABLE 5-continued

| # | R | D | $N_d$ | $v_d$ |
|---|---|---|---|---|
| 26 | −34.961 | 1.25 | 1.80609 | 40.9 |
| 27 | −150.871 | 1.00 | | |
| 28 | 49.448 | 5.48 | 1.48749 | 70.4 |
| 29 | −81.592 | 0.12 | | |
| 30 | 38.369 | 6.67 | 1.51453 | 54.7 |
| 31 | −38.005 | 1.30 | 1.83400 | 37.1 |
| 32 | 22.963 | 2.27 | | |
| 33 | 35.939 | 9.01 | 1.51824 | 58.9 |
| 34 | −23.203 | 1.25 | 1.80400 | 46.6 |
| 35 | −119.171 | 0.36 | | |
| 36 | 45.909 | 8.78 | 1.48749 | 70.4 |
| 37 | −30.304 | 0.0 | | |
| 38 | ∞ | 33.00 | 1.58266 | 46.4 |
| 39 | ∞ | 13.20 | 1.51633 | 64.0 |
| 40 | ∞ | | | |
| | f = 8.3–120.2 | $F_{NO}$ = 1.74–2.14 | | |

The lens surface listed with a * to the right of the surface number above (i.e., surface #23) is aspherical and also includes a diffractive optical element having diffraction zone micro structure formed on the aspherical surface. The shape of the aspherical surface without the diffractive optical element micro structure formed therein is given by Equation (A) above.

The values of D6, D10, D18 and D21 in the column of axial spacing D in Table 5 above are listed in Table 6.

TABLE 6

| | Wide-Angle End | Telephoto End |
|---|---|---|
| D6 | 6.65 | 6.65 |
| D10 | 0.80 | 49.02 |
| D18 | 50.33 | 4.05 |
| D21 | 4.37 | 2.43 |

The values of each of the constants K and $A_4$–$A_{10}$ of the aspherical surface #23 indicated in Table 5 above are listed in Table 7.

TABLE 7

| # | K | $A_4$ | $A_6$ | $A_8$ | $A_{10}$ |
|---|---|---|---|---|---|
| 23 | 0.9995410 | −0.7162937 × $10^{-6}$ | 0.7330643 × $10^{-9}$ | 0.7277318 × $10^{-12}$ | −0.1474951 × $10^{-15}$ |

In addition to being an aspherical surface as defined above, surface #23 includes a diffractive optical element micro structure having diffraction zones formed thereon according to the phase difference function Φ(Y) given in Equation (B) above. The coefficients E, F, G, H, and I of Equation (B) for the diffraction optical element micro structure on surface #23 are the same as for Embodiment 1 and are listed in Table 4 above.

Figure 6A:
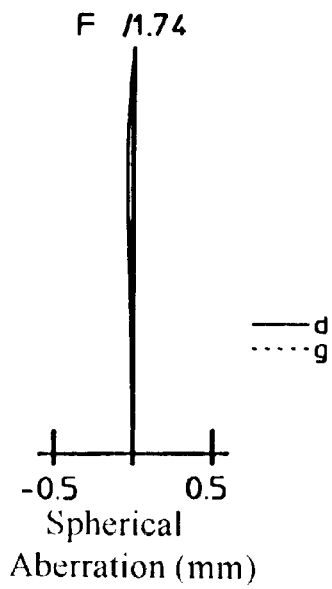
Figure 6B:
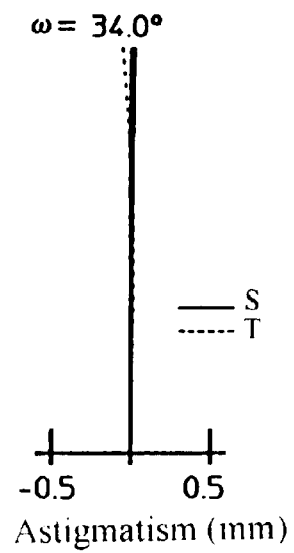
Figure 6C:
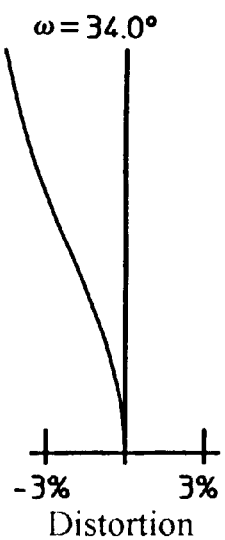
Figure 6D:
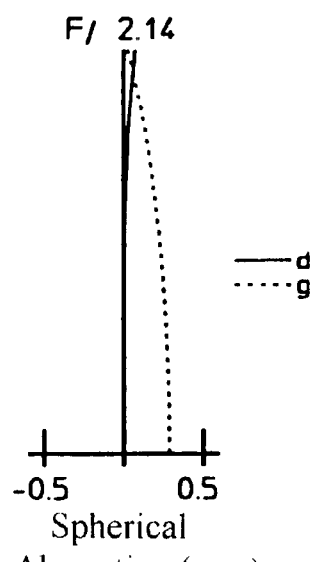
Figure 6E:
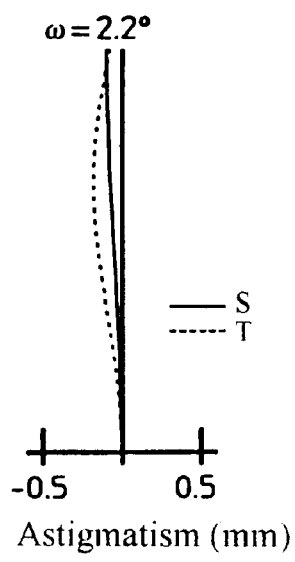
Figure 6F:
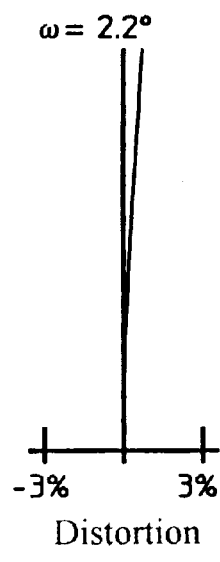

FIGS. 6A–6C show the spherical aberration, astigmatism, and distortion, respectively, for the zoom lens of Embodiment 2 at the wide-angle end. FIGS. 6D–6F show the spherical aberration, astigmatism, and distortion, respectively, for the zoom lens of Embodiment 2 at the telephoto end. In each spherical aberration figure, curves for both the d and g lines are illustrated. In each astigmatism figure, curves for both the sagittal S and tangential T image planes are illustrated. As is apparent from these figures, the aberrations are favorably corrected over the entire range of zoom so that high-quality images are obtained.

Just as in the previous embodiment, in this embodiment a light-weight, low cost zoom lens is achieved using an aspherical surface in at least a portion of the optical system that is micro-vibrated during the auto focus mode, thereby requiring fewer lens elements for a given quality of imaging as compared with the number of lens elements that would be required if only spherical lens elements were used. Further, the fact that the number of lens elements is reduced ensures that there is space to move the lens elements that are moved during focusing.

As described above, the zoom lens of this invention micro-vibrates, along the optical axis, some or all of the small and light lens elements of a lens group in the light path following the focus portion during auto focus mode in order to generate a signal that is monitored and used to move lens elements to adjust the focus of the zoom lens. The lens elements that are moved to adjust the focus in auto focus mode are the same lens elements that are moved in manual focus mode to adjust the focus. In this manner, a zoom lens capable of auto focus is provided even where the lens elements that are moved to manually adjust the focus are large and heavy. Thus, this invention provides a high-performance zoom lens suitable for business video cameras in which focus may be selectively adjusted manually when in manual mode, or automatically when in auto focus mode.

The invention being thus described, it will be obvious that the same may be varied in many ways. For example, the number and shape of the lens elements that form the lens groups can be properly selected. Furthermore, the lens group that is micro-vibrated during auto focus mode is not restricted to the fourth lens group, as some or all the lens elements of any lens group in the light path following the focus portion may be micro-vibrated. Further, either the entire focus portion or lens elements in the focus portion may be moved to perform focus adjustment. By fixing subgroup $G_{1A}$ and moving only subgroup $G_{1B}$ there is the advantage, however, in that the overall length of the zoom lens can be kept constant during focus adjustment. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A zoom lens having both manual mode and auto focus mode of focus adjustment, said zoom lens comprising, in order from the object side:

a focus portion;

a zoom portion; and a main portion; wherein zooming is accomplished by moving some or all of the lens elements in the zoom portion along the optical axis;

what would otherwise be a fluctuation of the image surface with change of object distance, is corrected as follows in manual mode, by manually moving some or all of the lens elements of the focus portion along the optical axis based on visual observation of the object through the zoom lens, and in auto focus mode, by micro-vibrating some or all of the lens elements of a lens group in the light path following the focus portion while detecting a signal that detects image quality variations caused by this micro-vibration, and by using the detected signal to automatically control the position of those lens elements in the focus portion that are manually moved in manual mode, so as to thereby automatically adjust the focus of the zoom lens; and wherein, in order from the object side, the first lens group has positive refractive power and comprises said focus portion;

the second and third lens groups comprise the zoom portion, said third lens group having negative refractive power;

the fourth and fifth lens groups comprise the main portion, and each of the fourth and fifth lens groups has positive refractive power; and the focal length of the zoom lens is changed by moving the second lens group and the third lens group along the optical axis, and some or all of the lens elements of the fourth lens group are micro-vibrated in the direction of the optical axis when in auto focus mode.

2. A zoom lens having both manual mode and auto focus mode of focus adjustment, said zoom lens comprising, in order from the object side:

a focus portion;

a zoom portion; and a main portion; wherein zooming is accomplished by moving some or all of the lens elements in the zoom portion along the optical axis;

what would otherwise be a fluctuation of the image surface with change of object distance, is corrected as follows in manual mode, by manually moving some or all of the lens elements of the focus portion along the optical axis based on visual observation of the object through the zoom lens, and in auto focus mode, by micro-vibrating some or all of the lens elements of a lens group in the light path following the focus portion while detecting a signal that detects image quality variations caused by this micro-vibration, and by using the detected signal to automatically control the position of those lens elements in the focus portion that are manually moved in manual mode, so as to thereby automatically adjust the focus of the zoom lens; and at least one surface of the lens elements that are micro-vibrated is non-spherical.

3. The zoom lens of claim 1, wherein at least one surface of the lens elements that are micro-vibrated is non-spherical.

4. A zoom lens having both manual mode and auto focus mode of focus adjustment, said zoom lens comprising, in order from the object side:

a focus portion;

a zoom portion; and a main portion; wherein zooming is accomplished by moving some or all of the lens elements in the zoom portion along the optical axis;

what would otherwise be a fluctuation of the image surface with change of object distance, is corrected as follows in manual mode, by manually moving some or all of the lens elements of the focus portion along the optical axis based on visual observation of the object through the zoom lens, and in auto focus mode, by micro-vibrating some or all of the lens elements of a lens group in the light path following the focus portion while detecting a signal that detects image quality variations caused by this micro-vibration, and by using the detected signal to automatically control the position of those lens elements in the focus portion that are manually moved in manual mode, so as to thereby automatically adjust the focus of the zoom lens; and at least one surface of the lens elements that are micro-vibrated includes a diffractive optical element having diffraction zones formed thereon.

5. The zoom lens of claim 1, wherein at least one surface of the lens elements that are micro-vibrated includes a diffractive optical element having diffraction zones formed thereon.

6. A zoom lens having both manual mode and auto focus mode of focus adjustment, said zoom lens comprising, in order from the object side:

a focus portion composed of a fixed, first subgroup located nearest the object side, and a moveable second lens group that may be moved along the optical axis;

a zoom portion; and a main portion; wherein zooming is accomplished by moving some or all of the lens elements in the zoom portion along the optical axis;

what would otherwise be a fluctuation of the image surface with change of object distance, is corrected as follows in manual mode, by manually moving some or all of the lens elements of the focus portion along the optical axis based on visual observation of the object through the zoom lens, and in auto focus mode, by vibrating some or all of the lens elements of a lens group in the light path following the focus portion while detecting a signal that detects image quality variations caused by this micro-vibration, and by using the detected signal to automatically control the position of those lens elements in the focus portion that are manually moved in manual mode, so as to thereby automatically adjust the focus of the zoom lens.

* * * * *

UNITED STATES PATENT AND TRADEMARK OFFICE
CERTIFICATE OF CORRECTION

PATENT NO.     : 6,522,479 B2
DATED          : February 18, 2003
INVENTOR(S)    : Yahagi It is certified that error appears in the above-identified patent and that said Letters Patent is hereby corrected as shown below:

Column 2,
Line 15, change "the, focal" to -- the focal --; and

Column 4,
Line 5, change "or air business" to -- or business --.

Signed and Sealed this

Twenty-second Day of April, 2003

JAMES E. ROGAN
*Director of the United States Patent and Trademark Office*